United States Patent
Yokoyama et al.

(10) Patent No.: US 12,462,539 B2
(45) Date of Patent: Nov. 4, 2025

(54) ANALYSIS DEVICE AND ANALYSIS METHOD

(71) Applicants: Morpho, Inc., Tokyo (JP); Tokyo Weld Co., Ltd., Tokyo (JP)

(72) Inventors: Yoshihiko Yokoyama, Tokyo (JP); Tsukasa Kato, Tokyo (JP); Daiju Kikuchi, Tokyo (JP); Satoshi Hirota, Tokyo (JP); Takuma Umeno, Tokyo (JP)

(73) Assignees: MORPHO, INC., Chiyoda-ku (JP); TOKYO WELD CO., LTD., Ota-ku (JP)

( * ) Notice: Subject to any disclaimer, the term of this patent is extended or adjusted under 35 U.S.C. 154(b) by 243 days.

(21) Appl. No.: 17/792,435

(22) PCT Filed: Feb. 2, 2021

(86) PCT No.: PCT/JP2021/003763
§ 371 (c)(1),
(2) Date: Jul. 13, 2022

(87) PCT Pub. No.: WO2021/161853
PCT Pub. Date: Aug. 19, 2021

(65) Prior Publication Data
US 2023/0024820 A1    Jan. 26, 2023

(30) Foreign Application Priority Data
Feb. 12, 2020    (JP) .................................. 2020-021332

(51) Int. Cl.
*G06V 10/776*    (2022.01)
*G06T 7/00*    (2017.01)
(Continued)

(52) U.S. Cl.
CPC .......... *G06V 10/776* (2022.01); *G06T 7/0004* (2013.01); *G06V 10/22* (2022.01);
(Continued)

(58) Field of Classification Search
CPC .. G06V 10/776; G06V 10/22; G06V 10/7715; G06V 10/774; G06V 10/82;
(Continued)

(56) References Cited

U.S. PATENT DOCUMENTS

| | | | |
|---|---|---|---|
| 2021/0166374 A1* | 6/2021 | Banno | G06N 3/084 |
| 2021/0364447 A1* | 11/2021 | Naruse | G06T 7/001 |

FOREIGN PATENT DOCUMENTS

| | | |
|---|---|---|
| CN | 102129563 A | 7/2011 |
| CN | 110274908 A | 9/2019 |

(Continued)

OTHER PUBLICATIONS

International Preliminary Report on Patentability dated Aug. 11, 2022 with a Translation of the Written Opinion of the International Searching Authority in Application No. PCT/JP2021/003763.
(Continued)

*Primary Examiner* — Michael A Lyons
(74) *Attorney, Agent, or Firm* — Sughrue Mion, PLLC (57) ABSTRACT

An analysis device for visualizing an accuracy of a trained determination device includes an acquisition unit acquiring an image pair of a non-defective product image and a defective product image, an extraction unit extracting an image region of a defective part of the defective product, a generation unit generating a plurality of image regions of pseudo-defective parts, a compositing unit synthesizing each of the image regions of the plurality of pseudo-defective parts with the non-defective product image to generate a plurality of composite images having different feature quantities, an unit outputting the plurality of composite images to
(Continued)

the determination device and acquiring a label corresponding to each of the plurality of composite images from the determination device, and a display control unit displaying an object indicating the label corresponding to each of the plurality of composite images in an array based on the feature quantities.

5 Claims, 7 Drawing Sheets

(51) Int. Cl.
*G06V 10/22* (2022.01)
*G06V 10/77* (2022.01)
*G06V 10/774* (2022.01)
*G06V 10/82* (2022.01)
*G06V 10/94* (2022.01)
*G06V 20/70* (2022.01)

(52) U.S. Cl.
CPC ........ *G06V 10/7715* (2022.01); *G06V 10/774* (2022.01); *G06V 10/82* (2022.01); *G06V 10/945* (2022.01); *G06V 20/70* (2022.01); *G06T 2207/20081* (2013.01); *G06T 2207/20084* (2013.01); *G06T 2207/30108* (2013.01)

(58) Field of Classification Search
CPC ...... G06V 10/945; G06V 20/70; G06V 20/60; G06T 7/0004; G06T 2207/20081; G06T 2207/20084; G06T 2207/30108; G06T 7/0008; G06T 7/001; G06T 2207/20224; G06T 5/50; G06T 7/11; G01N 21/88
See application file for complete search history.

(56) References Cited

FOREIGN PATENT DOCUMENTS

| | | |
|---|---|---|
| JP | 2005-156334 A | 6/2005 |
| JP | 2007-139621 A | 6/2007 |
| JP | 2010-164506 A | 7/2010 |
| JP | 2011-145179 A | 7/2011 |

OTHER PUBLICATIONS

International Search Report of PCT/JP2021/003763 dated May 11, 2021 [PCT/ISA/210].

* cited by examiner

ANALYSIS DEVICE AND ANALYSIS METHOD

CROSS REFERENCE TO RELATED APPLICATIONS

This application is a National Stage of International Application No. PCT/JP2021/003763 filed on Feb. 2, 2021, claiming priority based on Japanese Patent Application No. 2020-021332 filed on Feb. 12, 2020.

TECHNICAL FIELD

The present disclosure relates to an analysis device and an analysis method.

BACKGROUND ART

Patent Document 1 discloses an image inspection device including a means for creating a pseudo-defective product image that a neural network is caused to train. This image inspection device extracts difference data between a non-defective product image and a defective product image, and synthesizes the difference data whose position or magnitude has been converted, with the non-defective product image to create a pseudo-defective product image with a plurality of patterns. The image inspection device causes the neural network to train the created pseudo-defective product image as training data for a defective product. The image inspection device determines whether a subject of the image is non-defective or defective on the basis of the neural network.

CITATION LIST

Patent Document

[Patent Document 1] Japanese Unexamined Patent Publication No. 2005-156334

SUMMARY OF INVENTION

Technical Problem

Incidentally, the pseudo-defective product image generated by the image inspection device described in Patent Document 1 may include an image that may be determined to correspond to a non-defective product. Since the image inspection device described in Patent Document 1 trains all pseudo-defective product images as images corresponding to defective products, there is concern that a determination result of the image inspection device may differ from an assumption. Further, the image inspection device described in Patent Document 1 cannot verify a degree of a defect indicated by the difference data with which an image is determined to correspond to a non-defective product.

An object of the present disclosure to provide an analysis device and an analysis method capable of visualizing the accuracy of a determination device.

Solution to Problem

An analysis device according to an aspect of the present disclosure is an analysis device for visualizing the accuracy of a trained determination device for outputting any one of a non-defective product label indicating that a product is a non-defective product and a defective product label indicating that a product is a defective product by using an image with the product as a subject, the analysis device including: an acquisition unit configured to acquire an image pair of a non-defective product image with the non-defective product as a subject and a defective product image with the defective product as a subject; an extraction unit configured to extract an image region of a defective part of the defective product on the basis of the image pair; a generation unit configured to change a feature quantity of the image region of the defective part to generate a plurality of image regions of pseudo-defective parts; a compositing unit configured to synthesize each of the image regions of the plurality of pseudo-defective parts with the non-defective product image to generate a plurality of composite images having different feature quantities of the pseudo-defective parts; an image output unit configured to output the plurality of composite images to the determination device; a result acquisition unit configured to acquire a label corresponding to each of the plurality of composite images from the determination device; and a display control unit configured to display an object indicating the label corresponding to each of the plurality of composite images in an array based on the feature quantities.

Advantageous Effects of Invention

According to the present disclosure, the accuracy of the determination device can be visualized.

BRIEF DESCRIPTION OF DRAWINGS

(A) of FIG. 2 is a diagram illustrating an example of a step of extracting an image region of a defective part in an extraction unit.

(B) of FIG. 2 is a diagram illustrating an example of a step of generating image regions of pseudo-defective parts in a generation unit.

(C) of FIG. 2 is a diagram illustrating an example of a step of generating a composite image in a compositing unit.

DESCRIPTION OF EMBODIMENTS

Hereinafter, an embodiment of the present disclosure will be described with reference to the drawings. In the following description, the same or equivalent elements are denoted by the same reference signs, and duplicate description will not be repeated.

[Functional Configuration of Analysis Device]

Figure 1:
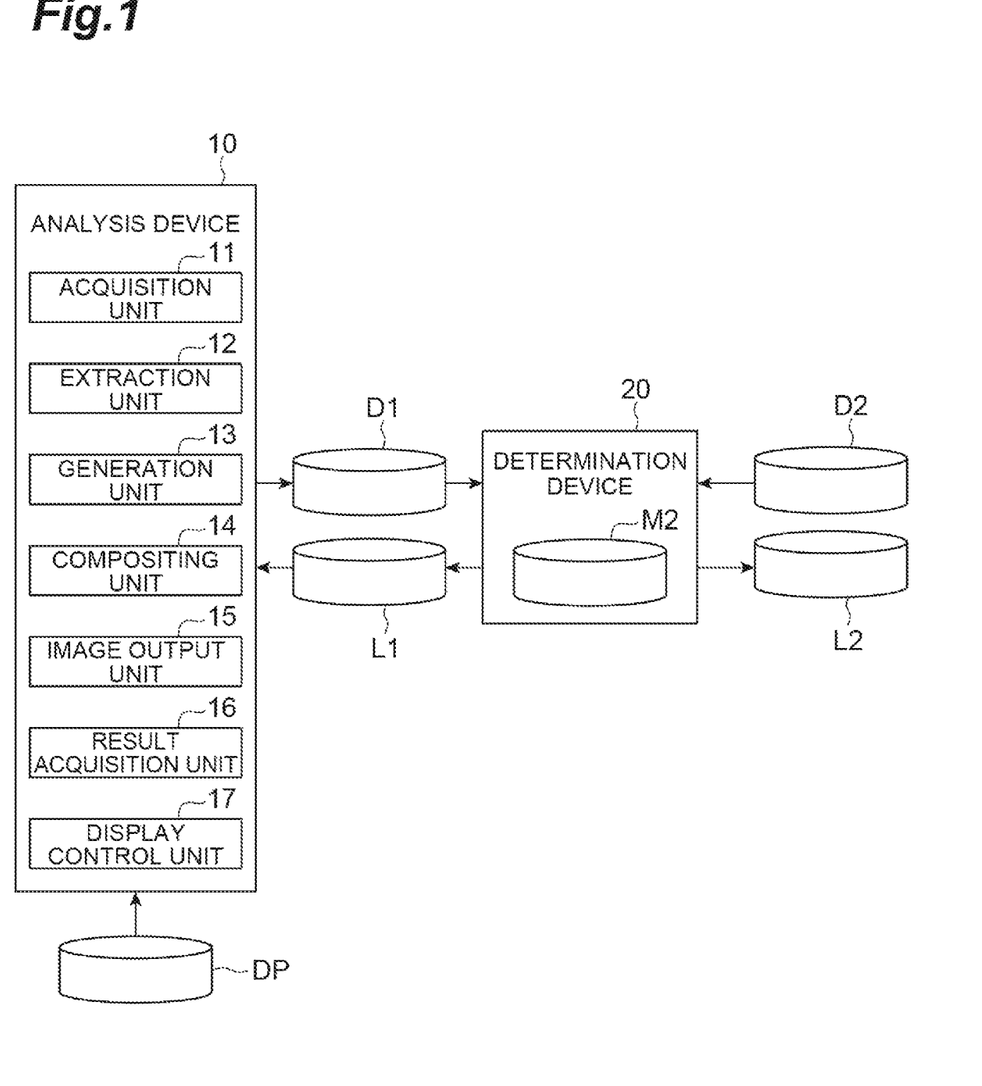
FIG. 1 is a block diagram illustrating an example of functions of an analysis device and a determination device according to an embodiment.

FIG. 1 is a block diagram illustrating an example of functions of an analysis device 10 and a determination device 20 according to an embodiment. The analysis device 10 illustrated in FIG. 1 is a device that visualizes the accuracy of the determination device 20. The determination device 20 has previously performed training in order to determine the quality of a product using an image with the product as a subject. The determination device 20 having performed training outputs any one of a non-defective product label and a defective product label. The label is information for identifying a preset category. The non-defective product label indicates that a product is a non-defective product, and the defective product label indicates that a product is a defective product. The non-defective product is a product that satisfies appearance quality standards, and the defective product is a product that does not satisfy the appearance quality reference.

The determination device 20 has a model M2 that exerts a determination function. In the determination device 20, a target image D2 is input to the model M2, and a label L2 is output from the model M2. The target image D2 is an image in which a product is a subject and is a determination target of the determination device 20. The label L2 is any one of a non-defective product label and a defective product label. The output label L2 may be assigned to the target image D2. Assigning to means associating with. For example, the assignment may be recording a relationship between the target image D2 and the label L2 in a table or the like, may be changing attribute information of the target image D2 so that the label L2 is included, or embedding the label L2 in the target image D2 itself.

The model M2 includes a neural network and parameters. The neural network has a structure in which a plurality of neurons are coupled. The neural network may be a hierarchical multi-layer neural network in which layers in which a plurality of neurons are grouped are connected. The neural network is defined by the number of neurons and a coupling relationship. A strength of coupling between the neurons or between the layers is defined using parameters (such as a weighting coefficient). In the neural network, data is input, and a feature of the data is output as a solution on the basis of calculation results of the plurality of neurons, and the parameters. In the model M2, the parameters are trained using a training image or the like so that a desired ability can be acquired. The training is adjusting the parameters to optimum values. The model M2 may be a copy of a model trained outside the determination device 20. Hereinafter, a case in which the model M2 receives the target image D2 with an electronic component as a subject and outputs the label L2 regarding the quality of the electronic component will be described by way of example. In this case, the appearance quality reference is determined by, for example, a degree of a chipping, discoloration, or scratching of the electronic component.

The analysis device 10 visualizes the accuracy with which the trained determination device 20 determines a non-defective product and a defective product. First, the analysis device 10 generates a plurality of images with an electronic component as a subject so that magnitudes of predetermined feature quantities of images regarding the defective part differ from each other. Then, the analysis device 10 outputs the generated plurality of images to the determination device 20, and acquires labels corresponding to the plurality of respective images. The analysis device 10 causes the display device or the like to display the objects indicating the acquired labels in an array based on the feature quantities. This allows an annotator (worker) to confirm a relationship between a magnitude of the feature quantity of the defective part and the label. In order to realize such a function, the analysis device 10 includes an acquisition unit 11, an extraction unit 12, a generation unit 13, a compositing unit 14, an image output unit 15, a result acquisition unit 16, and a display control unit 17.

The acquisition unit 11 acquires an image pair DP. The image pair DP is two images with an electronic component as a subject. The subject of the images constituting the image pair DP is the same as the product of the target image D2 input to the determination device 20. Images captured at the same angle of view are preferably used as the two images in the image pair DP. The image pair DP is configured of a non-defective product image in which the electronic component, which is the subject, is a non-defective product and a defective product image in which the electronic component, which is the subject, is a defective product. The image pair DP may be selected from an image group including a non-defective product image and a defective product image acquired in advance. A label (tag) may or may not be assigned to the image pair DP.

The extraction unit 12 extracts an image region of the defective part of the defective product included in the defective product image on the basis of the image pair DP. The defective part is a part at which an electronic component is chipped, a discolored part, a scratched part, or the like. The defective part is a portion different between the non-defective product image and the defective product image. The extraction unit 12 extracts the image region of the defective part on the basis of a difference between data of the non-defective product image and data of the defective product image.

Figure 2:
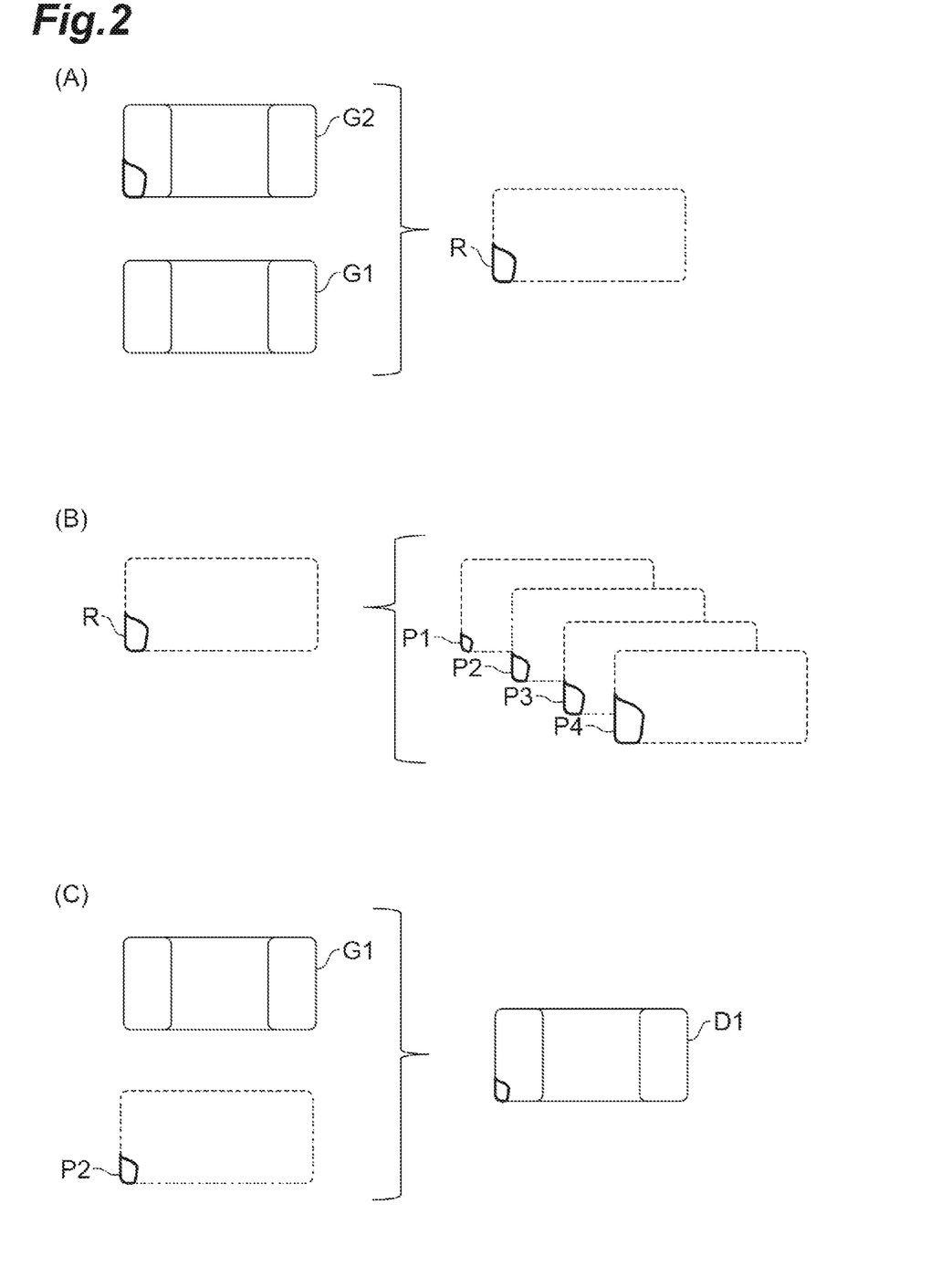

(A) of FIG. 2 is a diagram illustrating an example of a step of extracting the image region of the defective part in the extraction unit 12. In (A) of FIG. 2, an image pair DP of a non-defective product image G1 and a defective product image G2 having a defective product part is shown. The electronic component of the defective product image G2 has a part (an example of the defective part) at which the electronic component is chipped. As illustrated in (A) of FIG. 2, the extraction unit 12 extracts an image region R of the defective part on the basis of a difference in pixel value at each pixel position between the non-defective product image G1 and the defective product image G2. A defective part that is a target of the extraction unit 12 is not limited to chipping of the electronic component. Since the defective part is extracted on the basis of the difference between the non-defective product image G1 and the defective product image G2, the extraction unit 12 can extract the defective part without considering a type (chip, discoloration, or scratch) of defective part. The defective product image G2 may not be an image obtained by imaging an electronic component in which a defective part actually exists. For example, an image in which the defective part is manually marked on the non-defective product image G1 by an annotator operating a paint tool on a PC may be used as the defective product image G2. The extraction unit 12 is caused to extract the defective part marked by the annotator, thereby achieving an effect that thoughts of the annotator can be reflected in the defective part.

The generation unit 13 changes a feature quantity of the image region R of the defective part to generate a plurality of image regions of pseudo-defective parts. The pseudo-defective parts are simulated defective parts and are generated by calculation based on the image region R. The feature quantity of the image region R of the defective part depends on a type of defective part. For example, a feature quantity of a chip and a scratch of an electronic component is a horizontal width, a vertical length, a position, an area, or the like. A feature quantity of the discoloration of an electronic component is a horizontal width, a vertical length, a position, a hue, a saturation, a brightness, or the like. Here, the position is a concept including an XY direction (translation) and a θ direction (rotation direction) in an XY coordinate space. Hereinafter, a case in which image regions of pseudo-defective parts are generated with an area (a width and a length) of the chip of the electronic component as a feature quantity will be described by way of example.

(B) of FIG. 2 is a diagram illustrating an example of a step of generating image regions of pseudo-defective parts in the generation unit 13. As illustrated in (B) of FIG. 2, the generation unit 13 enlarges or reduces an image of the chip of the electronic component extracted as the image region R of the defective part. Accordingly, image regions P1 to P4 of a plurality of pseudo-defective parts are generated. The generation unit 13 generates the image regions P1 to P4 of the plurality of pseudo-defective parts having different areas of the chip of the electronic component by changing an enlargement ratio or a reduction ratio. In the example illustrated in (B) of FIG. 2, four image regions P1 to P4 are generated, but the number of image regions is not limited to four.

The compositing unit 14 synthesizes each of the image regions P1 to P4 of the plurality of pseudo-defective parts with the non-defective product image G1 to generate a plurality of composite images having different feature quantities. The compositing unit 14 synthesizes the image region of one of the pseudo-defective parts with one non-defective product image G1 to generate one piece of image data. The synthesis is performed by changing a pixel value of a pixel of the non-defective product image G1 corresponding to the image region of the pseudo-defective part. (C) of FIG. 2 is a diagram illustrating an example of a step of generating a composite image in the compositing unit 14. The compositing unit 14 synthesizes the image region P2 of the pseudo-defective part with the non-defective product image G1 to generate a composite image D1. The compositing unit 14 obtains a plurality of composite images with chips having various areas by performing synthesis on the respective image regions P1 to P4 of the plurality of pseudo-defective parts.

The generation unit 13 and the compositing unit 14 may generate the composite images using a scheme different from the above-described scheme. For example, the generation unit 13 can generate a plurality of masks by using the image region R of the defective part. The generation unit 13 can generate the image regions P1 to P4 of the plurality of pseudo-defective parts by extracting defective parts from the defective product image G2 using the plurality of respective masks. In this case, each of the image regions P1 to P4 of the plurality of pseudo-defective parts has a smaller area than the image region R of the defective part. The compositing unit 14 can synthesize each of the image regions P1 to P4 of the plurality of pseudo-defective parts extracted from the defective product image G2 with the non-defective product image G1.

The image output unit 15 outputs the plurality of composite images to the determination device 20. The determination device 20 inputs the composite images to the model M2 and outputs a label L1. The label L1 is information indicating any one of a non-defective product and a defective product that the model M2 determines on the basis of the area of the chip included in the composite image, similar to the label L2. The determination device 20 outputs the label L1 corresponding to each of the plurality of composite images.

The result acquisition unit 16 acquires the label L1 corresponding to each of the plurality of composite images from the determination device 20. Accordingly, for each composite image, the feature quantity of the image region of the pseudo-defective part in the composite image is associated with the label L1 corresponding to the composite image.

The display control unit 17 causes the display device to display objects indicating the label L1 corresponding to the plurality of respective composite images in an array based on feature quantities. The objects are figures, icons, symbols, and the like. Further, the display control unit 17 may display the plurality of composite images, as they are, and the objects on the display device without changing representations of the plurality of composite images. Further, the display control unit 17 may display the plurality of composite images enlarged or reduced at a desired ratio and the objects on the display device without changing the representations of the plurality of composite images. The display device is a display or the like.

Figure 3:
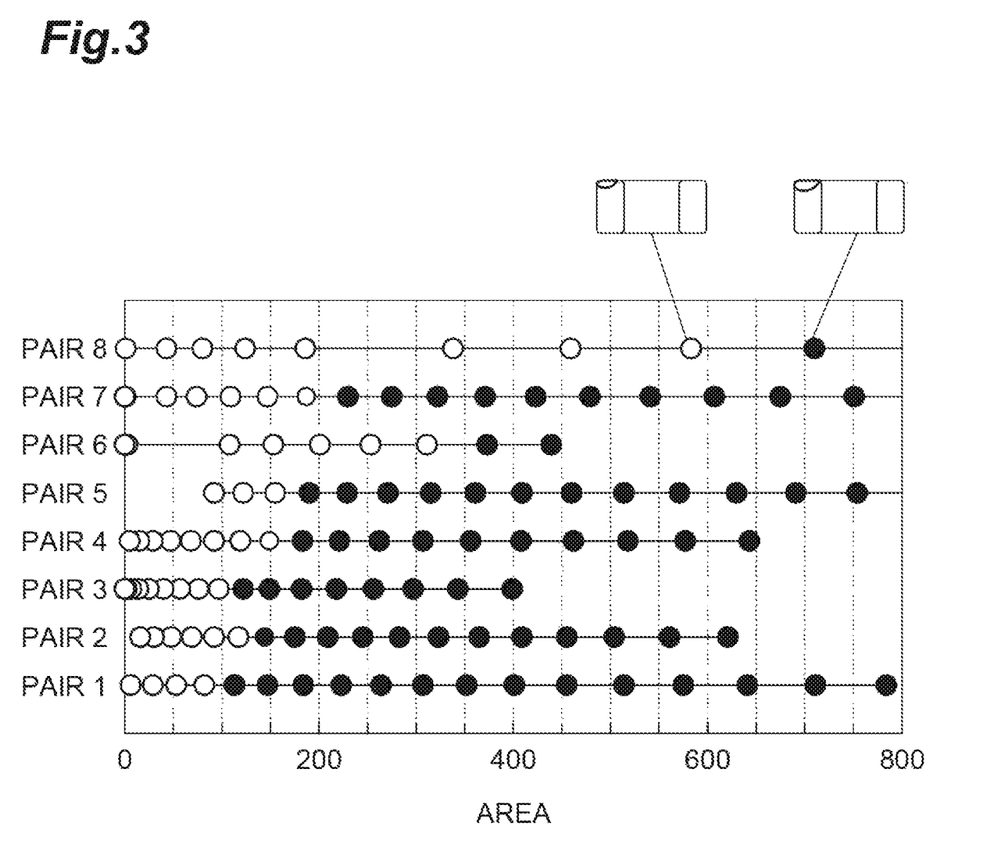
FIG. 3 is an example in which objects indicating a label corresponding to each of a plurality of composite images are displayed in an array based on a feature quantity.

FIG. 3 is an example in which objects indicating labels corresponding to a plurality of respective composite images are displayed in an array based on feature quantities. A horizontal axis indicates the feature quantity, and indicates an area of a pseudo-defective part in an image of an electronic component photographed to a predetermined size. The area of the pseudo-defective part is expressed by the number of pixels. The objects are linearly arranged for each image pair on the basis of magnitudes of the feature quantities. Here, objects indicating labels corresponding to a plurality of composite images generated from eight types of image pairs DP are illustrated from pair 1 to pair 8. When the label L1 is a non-defective product label, the object is displayed as a white circle object. When the label L1 is a defective product label, the object is displayed as a black circle object. For example, in an array of pair 1, a non-defective product label is assigned to the composite image D1 corresponding to the objects up to the fourth object from the left. A defective product label is assigned to the composite image D1 corresponding to the fifth and subsequent objects from the left. The composite image D1 corresponding to the object displayed on the left side of FIG. 3 is close to a non-defective product image in which an area of the chip of the electronic component is small. The composite image D1 corresponding to the object displayed on the right side of FIG. 3 is close to a defective product image in which the area of the chip is large.

In FIG. 3, threshold values for determining the label L1 in the determination device 20 are visualized with respect to a feature quantity that is the area of the pseudo-defective part. For example, it can be seen that the threshold values of pair 1 exist near a region having an area of 100 pixels. Since the threshold values for determining the label L1 in the determination device 20 are visualized for each pair, it is also possible to compare threshold values of the pairs with each other. For example, the threshold value of pair 8 is located between approximately 600 pixels and 700 pixels. The threshold values of pair 8 protrude as compared with the threshold values of pairs 1 to 7. When a pair of threshold values protruding as compared with the others is visualized in this way, the annotator can cause the composite image D1 corresponding to the objects before and after the threshold value of pair 8 to be displayed, and visually recognize whether the threshold value is accurate.

Figure 4:
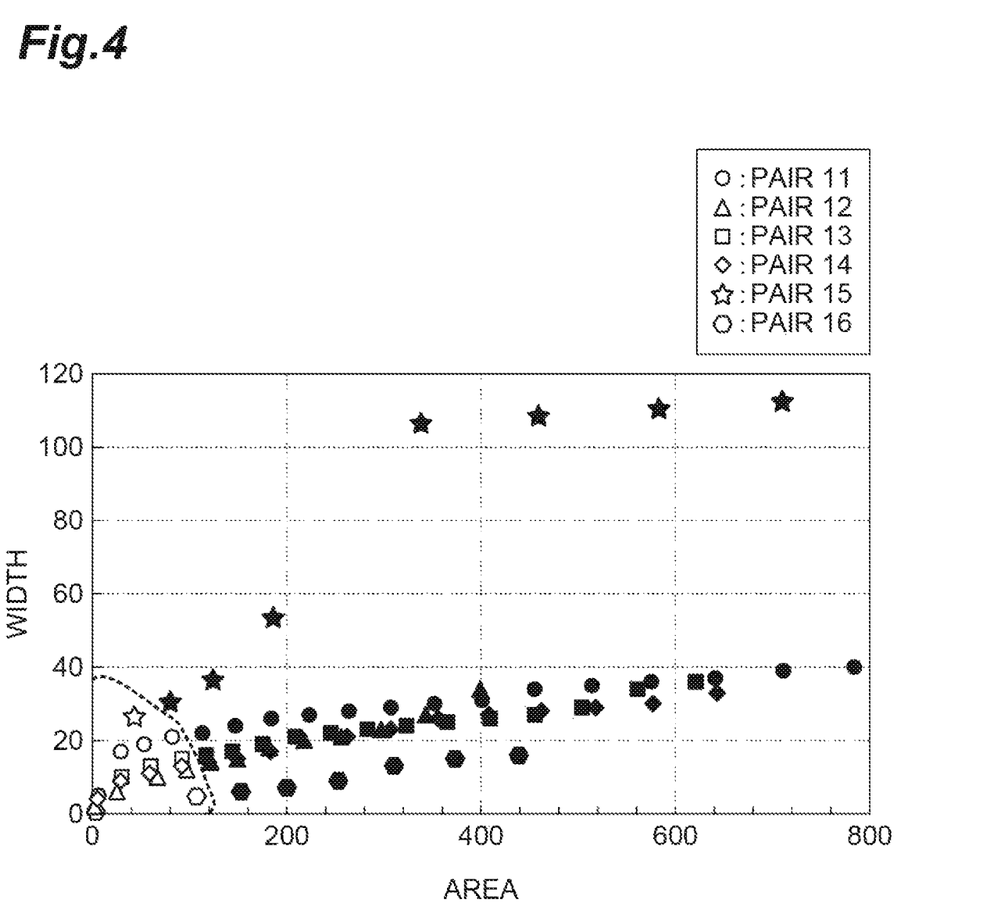
FIG. 4 is another example in which the objects indicating the label corresponding to each of the plurality of composite images are displayed in the array based on the feature quantities.

FIG. 4 is another example in which objects indicating labels corresponding to a plurality of respective composite images are displayed in an array based on feature quantities.

A horizontal axis is a first feature quantity and indicates an area of a pseudo-defective part in an image of an electronic component photographed to a predetermined size. A vertical axis is a second feature quantity and indicates a width of the pseudo-defective part in the image of the electronic component photographed to the predetermined size. The area and width of the pseudo-defective part are expressed by the number of pixels. The objects are arranged in a plane whose coordinate axes are the first feature quantity and the second feature quantity for each image pair. In the example of FIG. 4, objects indicating the label corresponding to the composite image D1 generated from six types of image pair DP are shown as an array of pairs 11 to 16. When the label L1 is a non-defective product label, the object is displayed as a white object, as in FIG. 3. When the label L1 is a defective product label, the object is displayed as a black-painted object.

In FIG. 4, the threshold values for determining label L1 in the determination device 20 are visualized with respect to two feature quantities including the area and the width of the pseudo-defective part. In FIG. 4, regions separating the non-defective product and the defective product are visualized in two dimensions by connecting the threshold values of the respective pairs with a line. For example, the threshold value of pair 15 is smaller than other threshold values when only an area is focused on. However, by the threshold values being visualized by a two-dimensional region, it is visualized that the threshold value of pair 15 is not a protruding value when a width is focused on. When there is a threshold value protruding from a two-dimensional region that separates a non-defective product and a defective product, the annotator can cause the composite image D1 corresponding to the objects before and after the protruding threshold value to be displayed, and visually recognize whether the threshold value is accurate.

[Hardware Configuration of Analysis Device]

Figure 5:
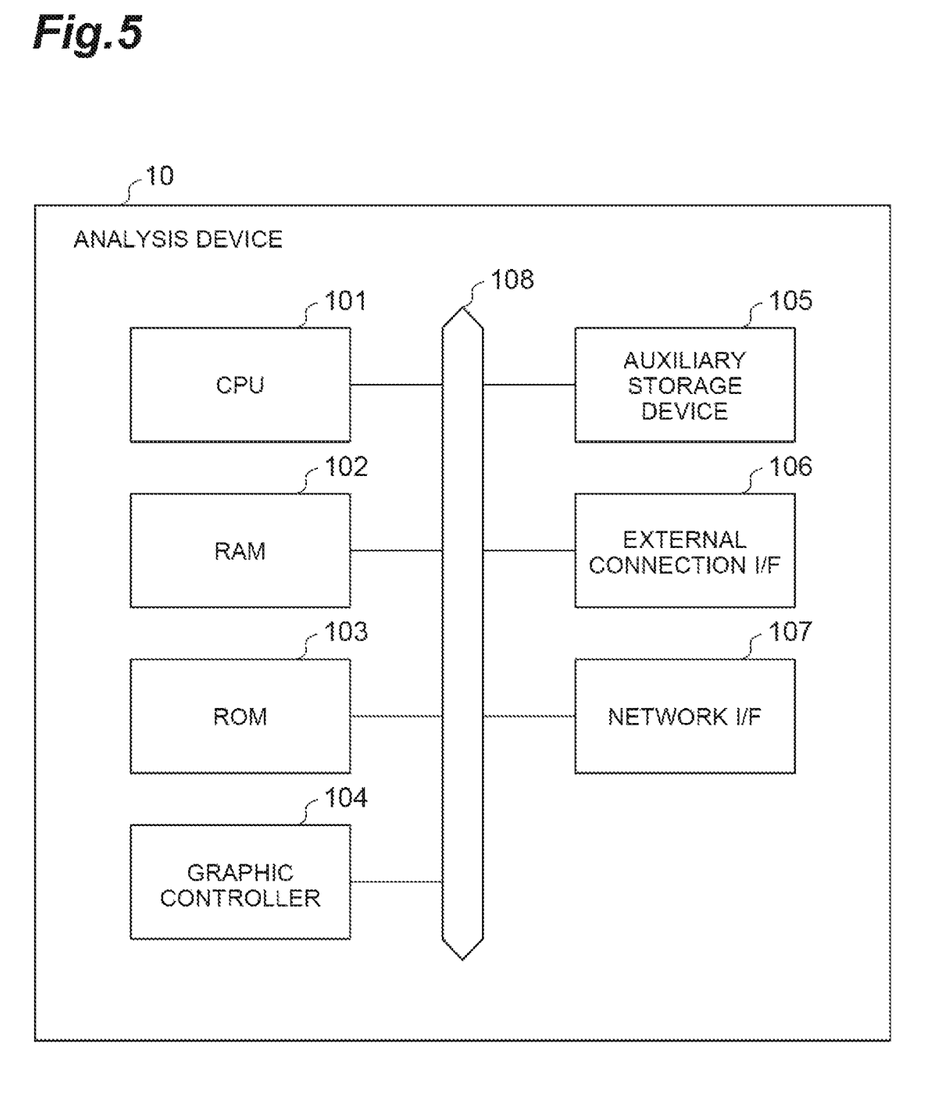
FIG. 5 is a block diagram illustrating an example of a hardware configuration of the device illustrated in FIG. 1.

FIG. 5 is a block diagram illustrating a hardware configuration of the device illustrated in FIG. 1. As illustrated in FIG. 5, the analysis device 10 is configured as a normal computer system including a central processing unit (CPU) 101, a random access memory (RAM) 102, a read only memory (ROM) 103, a graphic controller 104, an auxiliary storage device 105, an external connection interface 106 (hereinafter, the interface is referred to as "I/F"), a network I/F 107, and a bus 108.

The CPU 101 is configured of a calculation circuit and generally controls the analysis device 10. The CPU 101 reads a program stored in the ROM 103 or the auxiliary storage device 105 into the RAM 102. The CPU 101 executes various processing in the program read into the RAM 102. The ROM 103 stores a system program or the like that is used for control of the analysis device 10. The graphic controller 104 generates a screen caused to be displayed by the display control unit 17. The auxiliary storage device 105 has a function of a storage device. The auxiliary storage device 105 stores, for example, an application program for executing various processing. The auxiliary storage device 105 is configured of, for example, a hard disk drive (HDD), a solid state drive (SSD), or the like. The external connection I/F 106 is an interface for connecting various devices to the analysis device 10. The external connection I/F 106, for example, connects the determination device 20, a display, a keyboard, a mouse, and the like. The network I/F 107 performs communication with the determination device 20 or the like via the network on the basis of control of the CPU 101. The respective components described above are communicatively connected via the bus 108.

The analysis device 10 may include hardware other than the above. The analysis device 10 may include, for example, a graphics processing unit (GPU), a field-programmable gate array (FPGA), a digital signal processor (DSP), or the like. The analysis device 10 does not have to be housed in one housing as hardware and may be separated into several devices.

A function of the analysis device 10 illustrated in FIG. 1 is realized by the hardware illustrated in FIG. 5. The acquisition unit 11, the extraction unit 12, the generation unit 13, the compositing unit 14, the image output unit 15, the result acquisition unit 16, and the display control unit 17 are realized, by the CPU 101 executing a program stored in the RAM 102, ROM 103, or the auxiliary storage device 105 and processing data stored in the RAM 102, the ROM 103, or the auxiliary storage device 105 or data acquired via the external connection I/F 106 or the network I/F. For example, the display connected to the external connection I/F 106 displays a screen that is caused to be displayed by the display control unit 17. The determination device 20 illustrated in FIG. 1 is also configured of a part or all of the hardware illustrated in FIG. 5.

[Operation of Analysis Device]

Figure 6:
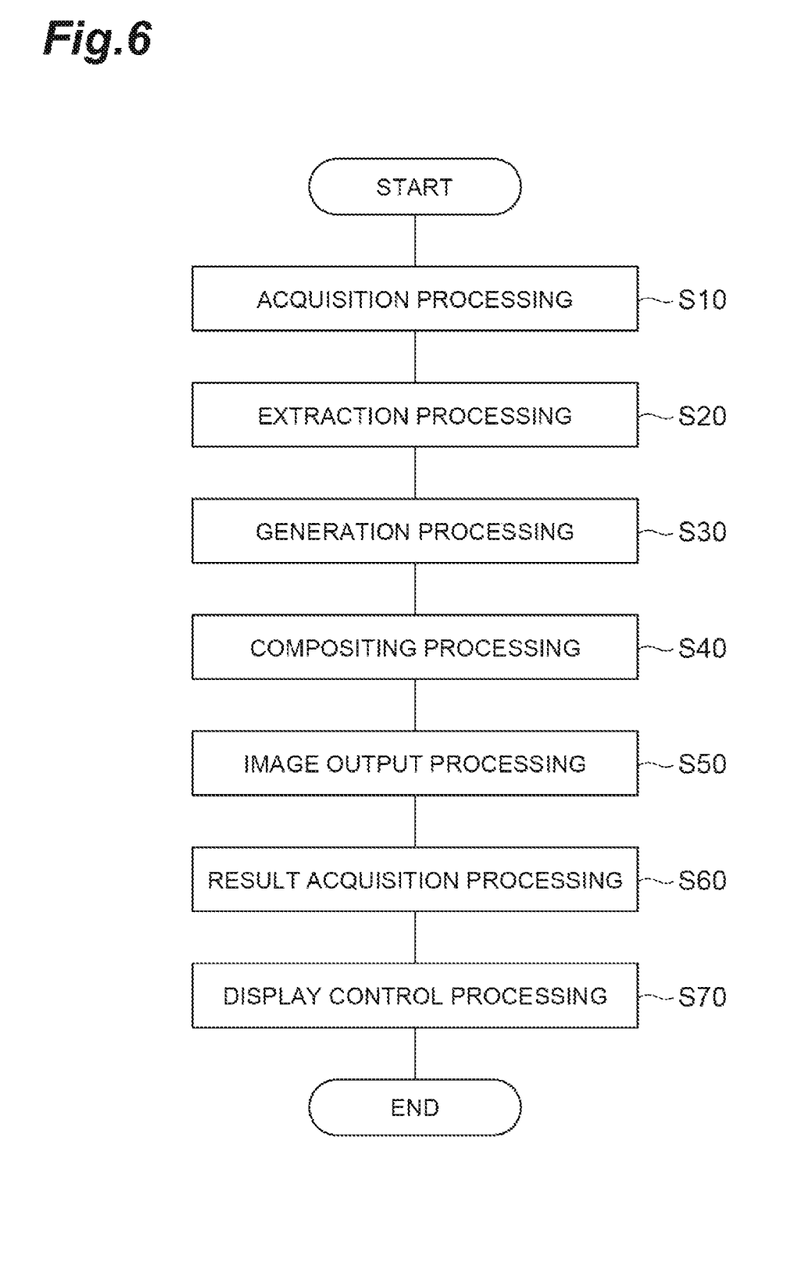
FIG. 6 is a flowchart of an analysis method.

FIG. 6 is a flowchart of an analysis method. The analysis method by the analysis device 10 includes acquisition processing (step S10), extraction processing (step S20), generation processing (step S30), synthesis processing (step S40), image output processing (step S50), result acquisition processing (step S60), and display control processing (step S70). The flowchart illustrated in FIG. 6 is started on the basis of, for example, a start instruction of an annotator.

First, the acquisition unit 11 of the analysis device 10 acquires the image pair DP configured of a non-defective product image G1 and a defective product image G2 in acquisition processing (step S10).

The extraction unit 12 of the analysis device 10 extracts the image region R of the defective part of the defective product included in the defective product image G2 in the extraction processing (step S20). The extraction unit 12, for example, extracts the image region R of the defective part on the basis of a difference between the data of the non-defective product image G1 and the data of the defective product image G2.

The generation unit 13 of the analysis device 10 changes the feature quantity of the image region R of the defective part to generate a plurality of image regions of the pseudo-defective parts in generation processing (step S30). The generation unit 13, for example, enlarges or reduces the image region of the defective part of the electronic component extracted as the image region R of the defective part to generate the image regions of the pseudo-defective parts.

The compositing unit 14 of the analysis device 10 synthesizes the image region of the pseudo-defective part with the non-defective product image G1 to generate the plurality of composite images D1 having different feature quantities in synthesis processing (step S40). The compositing unit 14, for example, generates the plurality of composite images having pseudo-defective parts having various enlarged or reduced areas.

The image output unit 15 of the analysis device 10 outputs the plurality of composite images to the determination device 20 in the image output processing (step S50).

The result acquisition unit 16 of the analysis device 10 acquires the label L1 corresponding to each of the plurality of composite images D1 from the determination device 20 in the result acquisition processing (step S60). Accordingly, for each composite image, the feature quantity of the image region of the pseudo-defective part in the composite image is associated with the label L1 corresponding to the composite image.

Finally, the display control unit 17 of the analysis device 10 displays objects indicating the label L1 corresponding to each of the plurality of composite images D1 in an array based on the feature quantities in the display control processing (step S70). The display control unit 17, for example, displays an object indicating at least one of a non-defective product label and a defective product label in an array based on the area of the pseudo-defective part, which is a feature quantity of the composite image D1. When the display control processing (step S70) ends, the flowchart illustrated in FIG. 6 ends.

Modification Example

Figure 7:
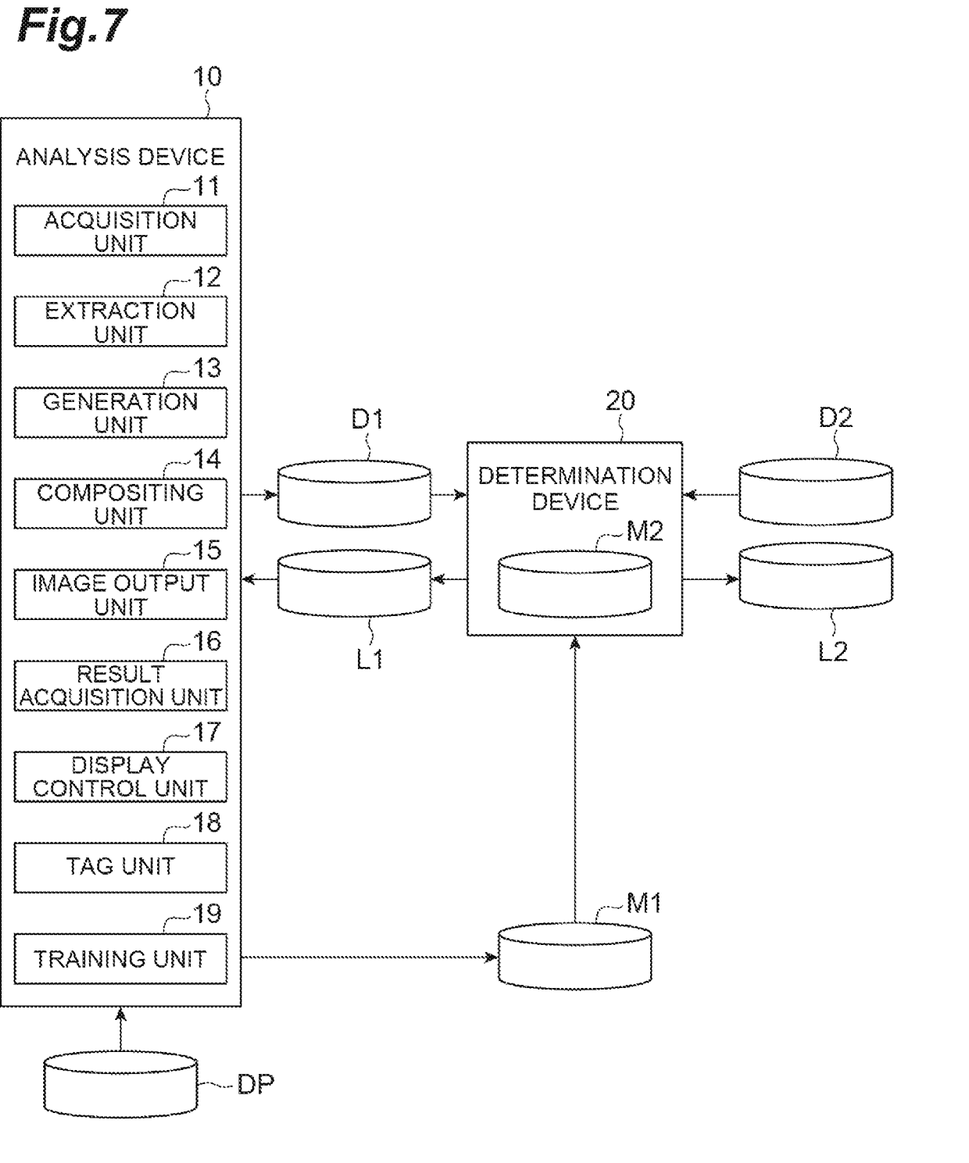
FIG. 7 is a block diagram illustrating another example of functions of the analysis device and the determination device according to the embodiment.

FIG. 7 is a block diagram illustrating an example of functions of the analysis device 10 and the determination device 20 according to the embodiment. The analysis device 10 may include a tag unit 18 and a training unit 19.

The tag unit 18 assigns a tag corresponding to the composite image D1 on the basis of a user operation. The user is a user of the analysis device 10 and includes an annotator and the like. The tag is information indicating whether the composite image is a non-defective product or a defective product, similar to label L1 and the label L2. The tag unit 18 has a function of receiving an operation by the user. The operation is an input or output of information through a user interface such as a mouse, a keyboard, or a display. The operation is realized via the external connection I/F 106. The user operation is specifically an instruction to assign a tag from the user, and is realized by selection or input. The tag unit 18 assigns a tag associated with the composite image D1. Alternatively, this is processing of changing the non-defective product tag associated with the composite image D1 to a defective product tag, or changing the defective product tag to a non-defective product tag. The tag unit 18 may collectively assign a plurality of tags on the basis of a user operation of changing the threshold value. When a training image is newly generated without passing through the determination device 20, the tag unit 18 may newly assign a tag to the composite image D1 on the basis of a user operation.

Hereinafter, a case in which the tag of the composite image D1 associated with the object of pair 8 in FIG. 3 is assigned will be described by way of example. In the array of pair 8, a defective product label is assigned to the composite image D1 associated with a first object from the right. A non-defective product label is assigned to the composite image D1 associated with the second and subsequent objects from the right. The threshold value of pair 8 is located between approximately 600 pixels and 700 pixels. When the annotator confirms the composite image D1 associated with the fifth object from the right and determines that the composite image D1 corresponds to a defective product, the annotator assigns a defective product tag to the composite image D1. When the defective product tag is assigned to the composite image D1 corresponding to the fifth object from the right of pair 8, a non-defective product tag is assigned to the composite images D1 corresponding to the second to fourth objects from the right of pair 8.

The training unit 19 causes the determination device 20 to perform training on the basis of the composite image D1 to which the tag has been assigned by the tag unit 18. For example, the training unit 19 causes the determination device 20 to perform training by causing the model M1 that is a master (original) of the model M2 to be trained.

The model M1 has a structure including the same neural network and parameters as those of the model M2. The training unit 19 causes the model M1 to be trained with the composite image D1 to which the tag has been assigned by the tag unit 18 as a training image. The training image is data that is a determination target of the determination device 20 with which a correct tag has been associated, with respect to the subject. The training image is the composite image D1 to which the correct tag has been assigned by the annotator.

Hereinafter, a case in which the label associated with the object of pair 8 in FIG. 3 is assigned and the composite image D1 corresponding to pair 8 becomes a training image will be described by way of example. The model M2 of the determination device 20 outputs a non-defective product label with respect to the composite image D1 associated with a fifth object from the right of pair 8. The annotator assigns a defective product tag to the composite image D1. The training unit 19 causes the model M1 to be trained with the composite image D1 to which the defective product tag has been assigned by the annotator as a training image. The model M1 trains that the composite image D1 associated with the fifth object from the right of pair 8 is determined to be a defective product. A training result of the model M1, which is the master, is reflected in the model M2 of the determination device 20.

The analysis device 10 may select the composite image D1 that is a training image on the basis of an effect of training of the model M1. The effect of the training of the model M1 is the accuracy with which the model M1 improved by the training unit 19 outputs the correct label L1. The effect of the training of the model M1 is determined on the basis of a predetermined evaluation value.

The predetermined evaluation value is calculated on the basis of a total feature quantity of the non-defective product image G1 constituting the image pair DP, a total feature quantity of the defective product image G2 constituting the image pair DP, and a total feature quantity of the composite image D1 generated from the image pair DP. The total feature quantity may be a calculation result in a layer immediately before an output layer when an image is input to the model M1 or the model M2. A case in which a non-defective product label is assigned to the composite image D1 will be illustrated herein. In this case, the predetermined evaluation value is determined in consideration of a degree (a first evaluation value) to which the total feature quantity of the composite image D1 with the non-defective product label is similar to the total feature quantity of the non-defective product image G1, and a degree (a second evaluation value) to which the total feature quantity of the composite image D1 with the non-defective product label is not similar to the total feature quantity of the defective product image G2. The degree of similarity may be evaluated with a distance between both in an n-dimensional feature space in which the total feature quantity can be plotted. The first evaluation value can be increased, for example, when a distance between the total feature quantity of the composite image D1 with the non-defective product label and the total feature quantity of the non-defective product image G1 is smaller. The second evaluation value can be increased, for example, when a distance between the total feature quantity of the composite image D1 with the non-defective product label and the total feature quantity of the defective product image G2 is larger. The predetermined evaluation value can be determined by a combination (for example, a ratio) of the first evaluation value and the second evaluation value. For the predetermined evaluation value for the composite image D1 to which the defective product label has been assigned, the first evaluation value and the second evaluation value can be calculated, and the first evaluation value and the second evaluation value can be combined with each other, as in the example of the non-defective product label.

Hereinafter, a case in which the acquisition unit 11 selects the image pair DP through combination from an image group including a non-defective product image and a defective product image acquired in advance will be described by way of example. The training unit 19 causes the model M1 to be trained with the composite image D1 to which the tag has been assigned by the tag unit 18 as a training image. The training unit 19 inputs the composite image D1 and the image pair DP that is original data of the composite image D1 to the model M1 and calculates the predetermined evaluation value. When it is determined that the training of the model M1 is sufficient on the basis of the predetermined evaluation value, the training unit 19 ends the training. The determination as to whether or not the training of the model M1 is sufficient is made based on, for example, a magnitude relationship between the predetermined evaluation value and a predetermined threshold value. When it is not determined that the training of the model M1 is sufficient, the training unit 19 causes the model M1 to be trained on the basis of the composite image D1 generated from the image pair DP of another combination. The training unit 19 causes the model M1 to be trained until it is determined that the training of the model M1 is sufficient on the basis of the predetermined evaluation value.

Conclusion of Embodiment

According to the analysis device 10, the image pair DP including the non-defective product image G1 with a non-defective product as a subject and the defective product image G2 with a defective product as a subject is acquired by the acquisition unit 11. The image region R of the defective part of the defective product based on the image pair DP is extracted by the extraction unit 12. The image regions P1 to P4 of the plurality of pseudo-defective parts obtained by changing the feature quantity of the image region R of the defective part are generated in the generation unit 13. The image regions P1 to P4 of the plurality of pseudo-defective parts are synthesized with the non-defective product image G1 and the plurality of composite images having different feature quantities are generated in the compositing unit 14. The plurality of composite images are output to the determination device 20 by the image output unit 15. The label L1 corresponding to each of the plurality of composite images output from the determination device 20 is acquired by the result acquisition unit 16. The objects indicating the label L1, which correspond to each of the plurality of composite images, are displayed in an array based on the feature quantities by the display control unit 17. Thus, the analysis device 10 can visualize the accuracy of the determination device 20.

The tag unit 18 assigns the tag corresponding to the composite image D1 on the basis of a user operation. In this case, the analysis device 10 can generate an accurate training image on the basis of the user operation.

The training unit 19 causes the determination device 20 to perform training on the basis of the composite image D1 to which the tag has been assigned by the tag unit 18. In this case, the analysis device 10 can cause the determination device 20 to train a training image reflecting an intention of the user again on the basis of a user operation.

Although the embodiment of the present disclosure has been described above, the present disclosure is not limited to the above-described embodiment. Although the configuration in which the analysis device 10 and the determination device 20 are physically or logically separated has been described in the above-described embodiment, the analysis device 10 and the determination device 20 may be integrated and physically or logically integral. That is, the analysis device 10 may be configured to include the determination device 20. The model M2 is not limited to a case in which the neural network and the parameters are included, and may be a model trained by a support vector machine. In addition, the model M2 may be a current rule-based determiner. Further, the model M2 is not limited to the neural network and the support vector machine, and is not limited to the above as long as a model such as a decision tree can make a determination with respect to an input.

REFERENCE SIGNS LIST

10 . . . Analysis device, 11 . . . Acquisition unit, 12 . . . Extraction unit, 13 . . . Generation unit, 14 . . . Compositing unit, 15 . . . Image output unit, 16 . . . Acquisition unit, 17 . . . Display control unit, 18 . . . Tag unit, 19 . . . Training unit, 20 . . . Determination device.

The invention claimed is:

1. An analysis device comprising:
a memory storing a plurality of instructions; and
a processor, wherein the plurality of instructions are configured to cause the processor to:
  acquire an image pair of a non-defective product image with a non-defective product as a first subject and a defective product image with a defective product as a second subject;
  extract an image region of a defective part of the defective product on a basis of the image pair;
  change a feature quantity of the image region of the defective part to generate a plurality of image regions of pseudo-defective parts;
  synthesize image regions of a plurality of pseudo-defective parts with the non-defective product image to generate a plurality of composite images having different feature quantities of the plurality of pseudo-defective parts;
  determine a label corresponding to each of the plurality of composite images, wherein: i) a non-defective product label indicates that a product in an image is the non-defective product and ii) a defective product label indicates that the product in the image is the defective product; and
  display an object indicating the label corresponding to each of the plurality of composite images in an array based on feature quantities, wherein the array is a graph displayed on an output device for viewing by an operator.

2. The analysis device according to claim 1, wherein the plurality of instructions are further configured to cause the processor to display the plurality of composite images and the object.

3. The analysis device according to claim 1, wherein the plurality of instructions are further configured to cause the processor to assign a tag corresponding to a composite image on a basis of a user operation.

4. The analysis device according to claim 3, wherein the plurality of instructions are further configured to cause the processor to perform training on a basis of the composite image and the tag corresponding to the composite image.

5. An analysis method comprising:
- acquiring an image pair of a non-defective product image with a non-defective product as a first subject and a defective product image with a defective product as a second subject;
- extracting an image region of a defective part of the defective product on a basis of the image pair;
- changing a feature quantity of the image region of the defective part to generate a plurality of image regions of pseudo-defective parts;
- synthesizing image regions of a plurality of pseudo-defective parts with the non-defective product image to generate a plurality of composite images having different feature quantities of the plurality of pseudo-defective parts;
- determining a label corresponding to each of the plurality of composite images, wherein: i) a non-defective product label indicates that a product in an image is the non-defective product and ii) a defective product label indicates that the product in the image is the defective product; and
- displaying an object indicating the label corresponding to each of the plurality of composite images in an array based on feature quantities, wherein the array is a graph displayed on an output device for viewing by an operator.

* * * * *